(12) United States Patent
Dongre et al.

(10) Patent No.: US 10,759,124 B2
(45) Date of Patent: *Sep. 1, 2020

(54) APPARATUS AND METHOD FOR MANUFACTURING LIQUID MOLDED COMPOSITES USING A DISCRETE NETWORK OF TOOL SURFACE RESIN DISTRIBUTION GROOVES

(71) Applicant: The Boeing Company, Chicago, IL (US)

(72) Inventors: Kaustubh Dongre, Port Melbourne (AU); Paul Evans, Port Melbourne (AU); Peter J. Lockett, Port Melbourne (AU); Jason J. McBain, Port Melbourne (AU); Max M. Osborne, Port Melbourne (AU); Manning Scarfe, Ascot Vale (AU)

(73) Assignee: The Boeing Company, Chicago, IL (US)

(*) Notice: Subject to any disclaimer, the term of this patent is extended or adjusted under 35 U.S.C. 154(b) by 199 days.

This patent is subject to a terminal disclaimer.

(21) Appl. No.: 15/819,862

(22) Filed: Nov. 21, 2017

(65) Prior Publication Data

US 2019/0152170 A1 May 23, 2019

(51) Int. Cl.
*B29C 70/54* (2006.01)
*B29C 70/44* (2006.01)

(52) U.S. Cl.
CPC .......... *B29C 70/548* (2013.01); *B29C 70/443* (2013.01)

(58) Field of Classification Search
CPC ...... B29C 70/548; B29C 70/443; B29C 70/48
See application file for complete search history.

(56) References Cited

U.S. PATENT DOCUMENTS 4,942,013 A * 7/1990 Palmer ................ B29C 43/3642
156/285
5,958,325 A * 9/1999 Seemann, III ........ B29C 43/021
264/510

(Continued)

FOREIGN PATENT DOCUMENTS

EP 1602470 12/2005
EP 1721719 11/2006

(Continued)

OTHER PUBLICATIONS

Vaidya, U.; Abraham, A.; Bhide, S. Affordable Processing of Thick Section and Integral Multi-Functional Composites. Composites Part A: Applied Science and Manufacturing 2001, 32 (8), 1133-1142. (Year: 2001).*

(Continued)

*Primary Examiner* — William P Fletcher, III
(74) *Attorney, Agent, or Firm* — Joseph M. Rolnicki; Evans & Dixon, L.L.C.

(57) ABSTRACT

A method of infusing liquid resin into a preform involves positioning a preform on a planar section of a tool surface and a trough section of the tool surface, where the planar section of the tool surface is positioned vertically above the trough section of the tool surface and with there being a plurality of grooves in the planar section of the tool surface and a bottom of the trough section of the tool surface. At least one of a fluid impervious sheet, a second tool and a vacuum bag is secured on the tool surface over the preform forming a sealed volume on the tool surface. A pressure differential and a flow of resin is supplied onto the tool surface and the liquid resin is infused into the preform by the pressure differential.

20 Claims, 11 Drawing Sheets

(56) References Cited

U.S. PATENT DOCUMENTS

| | | | |
|---|---|---|---|
| 6,406,659 B1 | 6/2002 | Lang et al. | |
| 6,586,054 B2 * | 7/2003 | Walsh | B29C 70/443 264/101 |
| 6,773,655 B1 * | 8/2004 | Tunis, III | B29C 43/021 264/510 |
| 6,919,039 B2 | 7/2005 | Lang et al. | |
| 8,675,335 B2 * | 3/2014 | Wilson | B29C 70/443 361/218 |
| 8,904,213 B2 | 12/2014 | Chan et al. | |
| 10,252,479 B2 * | 4/2019 | Weinholdt | B29C 70/48 |
| 2002/0146529 A1 * | 10/2002 | Lang | B29C 70/443 428/36.9 |
| 2008/0044506 A1 * | 2/2008 | Zahlen | B29C 70/443 425/130 |
| 2011/0174536 A1 * | 7/2011 | Wilson | B29C 70/443 174/845 |
| 2013/0280483 A1 | 10/2013 | Hayashi | |
| 2015/0102535 A1 * | 4/2015 | Lutz | B29C 70/547 264/553 |
| 2016/0214329 A1 * | 7/2016 | Fernandes | B29C 70/34 |

FOREIGN PATENT DOCUMENTS

| | | | |
|---|---|---|---|
| EP | 2687357 A1 * | 1/2014 | ........... B29C 70/548 |
| EP | 3090863 | 11/2016 | |
| EP | 3090863 A1 * | 11/2016 | ............. B29C 70/48 |
| GB | 2519160 | 4/2015 | |
| JP | 2001062932 | 3/2001 | |
| JP | 2004181627 | 7/2004 | |

OTHER PUBLICATIONS

Marsh, G. Bombardier Throws down the Gauntlet with CSeries Airliner. Reinforced Plastics 2011, 55 (6), 22-26. (Year: 2011).*
Extended European Search Report dated May 14, 2019, issued in co-pending European Patent Application No. 18206115.0.
Extended European Search Report dated May 14, 2019, issued in co-pending European Patent Application No. 18201899.4.
David Inston, Plant tour: Spirit AeroSystems: Prestwick, Scotland, UK; CompositesWorld, Jan. 29, 2016.
GCC Examination Report dated Feb. 20, 2020, issued in co-pending Arab States of the Gulf Patent Application No. GC 2018-36482.

* cited by examiner

APPARATUS AND METHOD FOR MANUFACTURING LIQUID MOLDED COMPOSITES USING A DISCRETE NETWORK OF TOOL SURFACE RESIN DISTRIBUTION GROOVES

FIELD

This disclosure is directed to a tool and its method of use, where a plurality of grooves are cut or formed into the tool surface of the tool. The grooves have different cross-section dimensions, different lengths, different configurations and/or different patterns that function as tool surface resin distribution grooves. The grooves distribute and deliver resin supplied to the tool surface throughout a dry fiber composite layup positioned on the tool surface in resin infusion and resin transfer molding. The grooves are formed in the tool surface extending to discrete areas on the tool surface to direct a flow of liquid resin to the discrete areas and infuse the dry fiber composite layup with the liquid resin at those discrete areas of the tool surface.

BACKGROUND

In tool or tool surface resin distribution molding in forming fiber reinforced composite parts, dry fiber composite is laid up on the tool surface forming a preform on the tool surface.

In liquid molding, a fluid impervious sheet, a second tool (with or without grooves) or vacuum bag is then secured to the tool surface over the preform. The edges of the vacuum bag, or tool are sealed to the tool surface to form a sealed volume on the tool surface containing the preform.

A supply of liquid resin is then introduced into the sealed volume to wet the preform on the tool surface. A pressure differential is applied to the sealed volume, to draw the liquid resin across the preform and to infuse the liquid resin into the preform. Vacuum may be applied to create the pressure differential. The liquid resin is then cured, forming the fiber reinforced composite part.

To assist in the distribution of the liquid resin throughout the preform, resin distribution media are often positioned in the sealed volume between the vacuum bag and the tool surface. The resin distribution media is typically positioned on top of the preform and/or beneath the preform. The resin distribution media form pathways through which the liquid resin can flow when infusing the preform with the liquid resin. The resin distribution media thereby distribute the liquid resin entirely over the preform.

However, after curing of the fiber reinforced composite part, the resin distribution media must be removed from the part and discarded. Both the resin distribution media and any additional resin it contains are discarded. Thus, the use of resin distribution media to distribute liquid resin throughout the preform results in wasted resin.

Additionally, as the liquid distribution media is positioned on top of the preform, the fiber composite layup forming the preform can be altered. This could result in a fiber reinforced composite part not having the structural strength intended.

Still further, the use of resin distribution media on the preform to distribute liquid resin throughout the preform could result in the resin distribution media negatively affecting the surface of the fiber reinforced composite part being molded.

SUMMARY

The apparatus and its method of use of this disclosure provides targeted liquid resin distribution throughout an assembled dry fiber composite preform in resin infusion and resin transfer molding by using a discrete network of infusion grooves formed in a tool surface of a tool. The grooves are formed in the tool surface in predetermined patterns or configurations that extend from the resin source to discrete areas on the tool surface that would typically be difficult to reach by the liquid resin distributed over the tool surface.

The tool is used to supply resin into a dry fiber composite layup, or a preform using a pressure differential. In the method of using the tool, the preform is first positioned on a tool surface of the tool into which a plurality of grooves have been formed or machined. The plurality of grooves include several different patterns or configurations of grooves and different dimensions of grooves on the tool surface. The different patterns and different dimensions of the grooves are determined to optimize the delivery and distribution of liquid resin throughout the preform positioned on the tool surface. The preform is positioned on the tool surface covering over the plurality of grooves.

A fluid impervious sheet or tool or a vacuum bag is then positioned on the tool surface. The vacuum bag covers over the preform.

The fluid impervious sheet, tool or vacuum bag is then sealed to the tool surface over the preform and around the preform. This forms a sealed volume around the preform.

A flow of liquid resin is then supplied into the sealed volume. The flow of liquid resin may be introduced at one end of the tool surface, along one or more edges of the tool surface, or at discrete locations between the tool surface and the preform.

A pressure differential is also applied to the sealed volume to draw the liquid resin across the tool surface and through the preform.

The flow of liquid resin supplied into the sealed volume is directed through the preform by the pressure differential pulling the flow of resin through the grooves in the tool surface. The grooves in the tool surface direct the flow of liquid resin to targeted areas on the tool surface and assist in the distribution of the liquid resin throughout the preform.

The liquid resin is then cured in the preform, forming the fiber reinforced composite part.

The composite part is then removed from the tool surface of the tool. Any resin remaining in the grooves in the surface of the tool is then cleaned from the grooves.

The features, functions and advantages that have been discussed can be achieved independently in various embodiments or may be combined in yet other embodiments, further details of which can be seen with reference to the following description and drawings.

DETAILED DESCRIPTION

Figure 1:
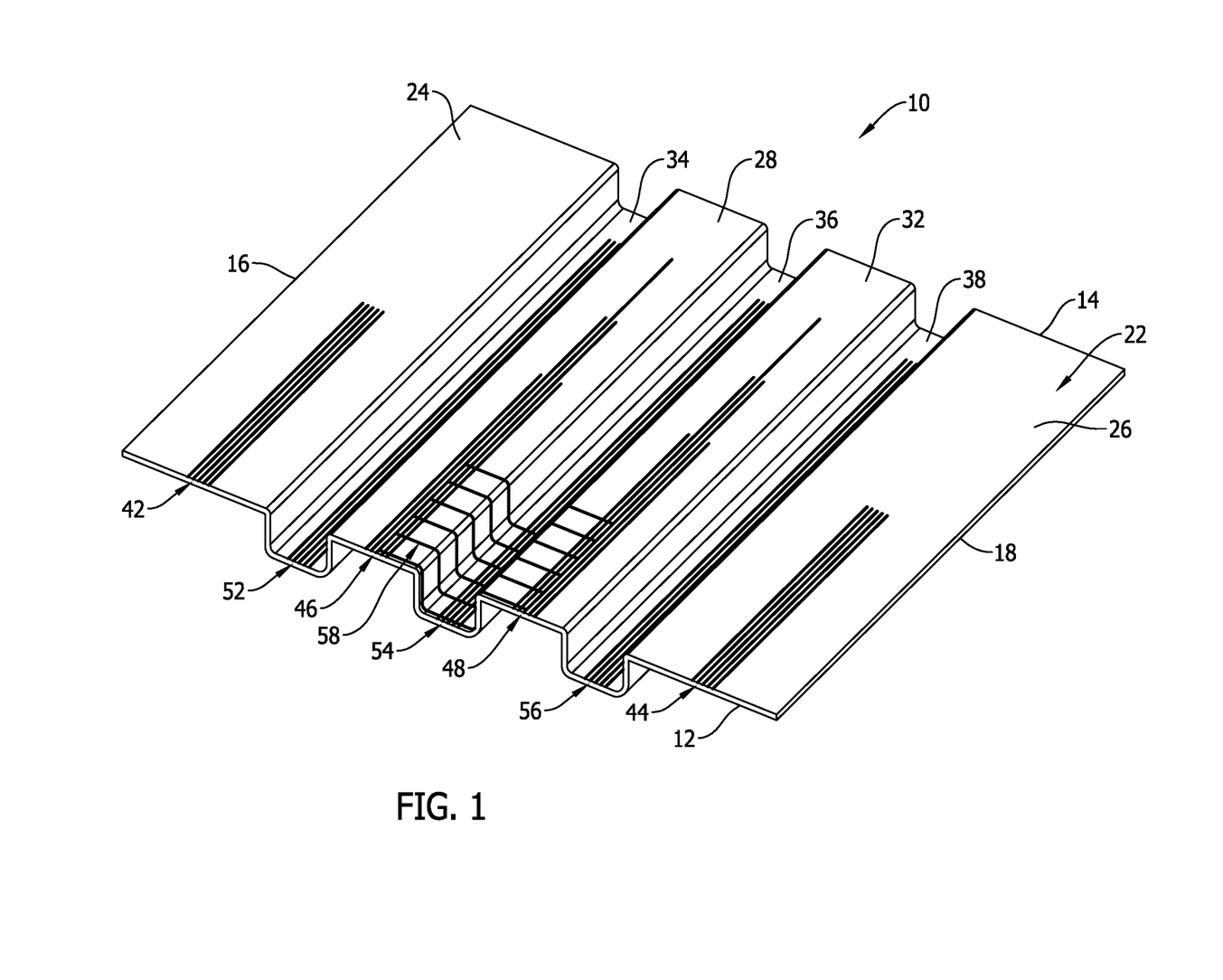
FIG. 1 is a representation of an isometric view of a first example of the tool of this disclosure.
Figure 2:
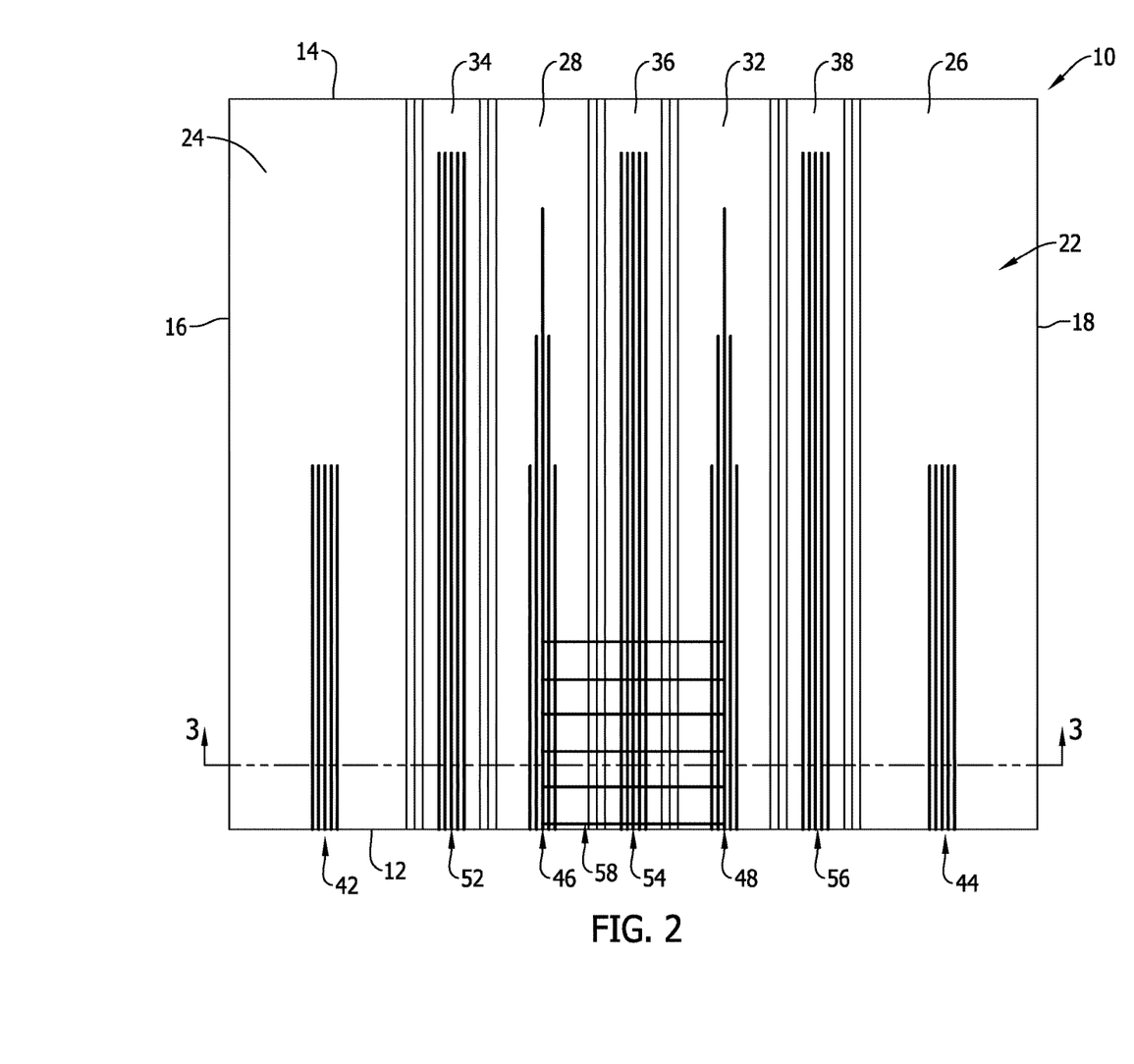
FIG. 2 is a representation of a plan view of the tool of FIG. 1.
Figure 3:
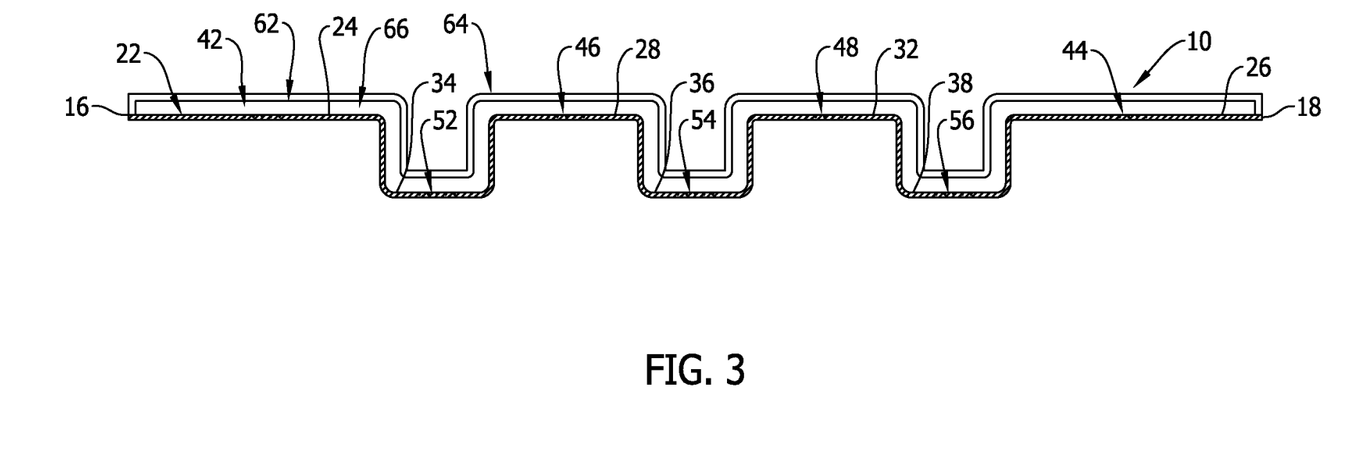
FIG. 3 is a representation of a cross-section view of the tool of FIG. 2.

FIGS. 1-3 are representations of a first example of a tool 10 used in practicing a method of directing a flow of liquid resin through a preform. As represented in FIGS. 1-3, the tool 10 has a general rectangular configuration defined by first 12 and second 14 opposite, parallel edges and third 16 and fourth 18 opposite, parallel edges. Although the tool 10 is represented as having a rectangular configuration in FIGS. 1-3, the tool could have other equivalent configurations. The four edges 12, 14, 16, 18 of the tool 10 extend around and form a periphery of a top surface or a tool surface 22 of the tool. As represented in FIGS. 1-3, the tool surface 22 of the tool 10 has four planar sections 24, 26, 28, 32 and three trough sections 34, 36, 38. The tool surface 22 could have various other, equivalent configurations, depending on the configuration of the composite part to be formed by the tool 10.

A first plurality of grooves 42 and a second plurality of grooves 44 are formed in the respective planar sections 24, 26 at the opposite sides of the tool surface 22. The first plurality of grooves 42 and the second plurality of grooves 44 are all straight, parallel grooves that extend across the respective planar sections 24, 26 of the tool surface 22 from the first edge 12 of the tool 10 toward the second edge 14, but stop about halfway across the tool surface 22. The first plurality of grooves 42 and the second plurality of grooves 44 are machined into the tool surface 22 or formed in the tool surface 22 by an other equivalent means. The first plurality of grooves 42 and the second plurality of grooves 44 are arranged in basically the same configuration or pattern, and have substantially the same lengths. As represented in FIG. 3, the first plurality of grooves 42 and the second plurality of grooves 44 have substantially the same cross-section configurations. Although the cross-section configurations are represented as having a v-shape, the grooves could have other equivalent cross-section configurations such as rounded, square, etc.

A third plurality of grooves 46 and a fourth plurality of grooves 48 are formed in the respective planar sections 28, 32 in the middle of the tool surface 22. The third plurality of grooves 46 and the fourth plurality of grooves 48 are straight, parallel grooves that extend from the first edge 12 of the tool 10 toward the opposite second edge 14 of the tool, but stop short of the second edge 14. The third plurality of grooves 46 and the fourth plurality of grooves 48 are also machined into the tool surface 22 or formed in the tool surface 22 by other equivalent means. The third plurality of grooves 46 and the fourth plurality of grooves 48 are arranged in basically the same configurations or patterns, and include grooves having different lengths. Thus, the configuration or pattern of the third plurality of grooves 46 and the fourth plurality of grooves 48 is different from the configuration or pattern of the first plurality of grooves 42 and the second plurality of grooves 44. As represented in FIG. 3, the third plurality of grooves 46 and the fourth plurality of grooves 48 have substantially the same cross-section configurations.

A fifth plurality of grooves 52, a sixth plurality of grooves 54 and a seventh plurality of grooves 56 are also formed in the top surface 22. The fifth plurality of grooves 52, the sixth plurality of grooves 54 and the seventh plurality of grooves 58 extend across the tool surface 22 of the tool 10 at the bottoms of the three trough sections 34, 36, 38, respectively. The fifth plurality of grooves 52, the sixth plurality of grooves 54 and the seventh plurality of grooves 56 are all straight, parallel grooves that extend from the first edge 12 of the tool 10 toward the opposite second edge 14 of the tool, but end short of the second edge. Again, the grooves are machined into the tool surface 22 or formed in the tool surface 22 by other equivalent means. The grooves of the fifth plurality of grooves 52, the sixth plurality of grooves 54 and the seventh plurality of grooves 56 are all formed with the same lengths. However, the lengths of the grooves of the fifth plurality of grooves 52, the sixth plurality of grooves 54 and the seventh plurality of grooves 56 are all different from the lengths of the first plurality of grooves 42, the second plurality of grooves 44, the third plurality of grooves 46 and the fourth plurality of grooves 48. Thus, the pattern or configuration of the grooves of the fifth plurality of grooves 52, the sixth plurality of grooves 54 and the seventh plurality of grooves 56 are the same, but are different from the configurations or patterns of the first plurality of grooves 42, the second plurality of grooves 44, the third plurality of grooves 46 and the fourth plurality of grooves 48. As represented in FIG. 3, the fifth plurality of grooves 52, the sixth plurality of grooves 54 and the seventh plurality of grooves 56 have substantially the same cross-section configuration.

An eighth plurality of grooves 58 is also formed in the tool surface 22. As represented in FIGS. 1 and 2, the eighth plurality of grooves 58 is formed in the tool surface 22 perpendicular to the first, second, third, fourth, fifth, sixth and seventh pluralities of grooves. The eighth plurality of grooves 58 are all straight, parallel grooves that extend across some of the third 46 and fourth 48 pluralities of grooves on the respective third 28 and fourth 32 planar sections of the tool surface 22, and extend across the sixth plurality of grooves 54 in the trough section 36 at the center of the tool surface 22. Thus, the eighth plurality of grooves 58 communicate some of the third 46 and fourth 48 pluralities of grooves with the sixth plurality of grooves 54 at the center of the tool surface 22. The grooves of the eighth plurality of grooves 58 are spaced further from each other than the first, second, third, fourth, fifth, sixth and seventh pluralities of grooves. Additionally, the grooves of the eighth plurality of grooves 58 are wider than the grooves of the first, second, third, fourth, fifth, sixth and seventh pluralities of grooves, and therefore have a larger cross-section configuration.

Figure 4:
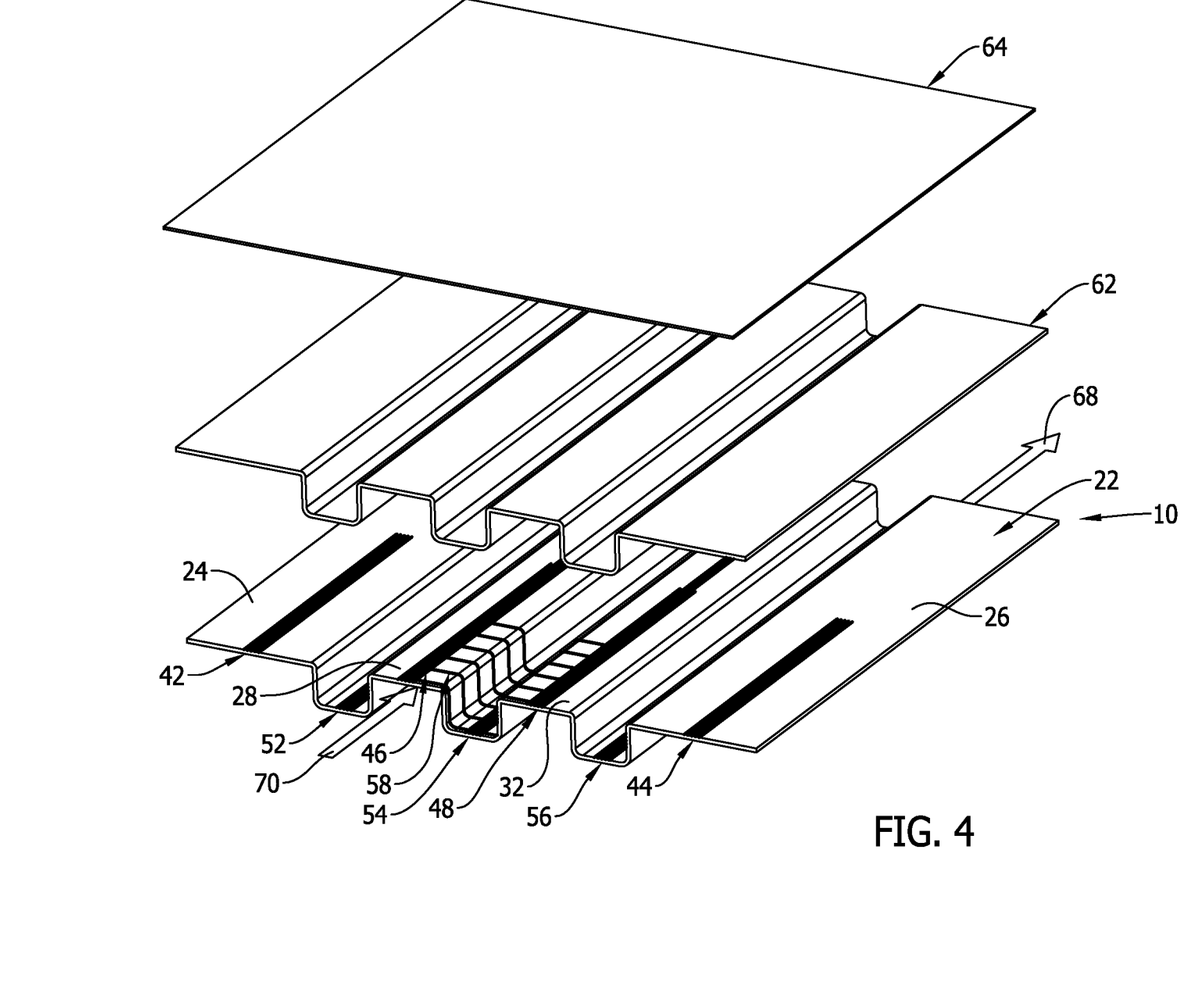
FIG. 4 is a representation of an isometric view of the tool of FIG. 1 with a dry fiber composite preform and a vacuum bag in preparing the tool of FIG. 1 for infusing liquid resin through the preform using the pressure differential.

FIG. 4 is a representation of the method of using the tool 10 in manufacturing a fiber reinforced composite part in resin infusion and resin transfer molding. In the method represented in FIG. 4, a dry fiber composite preform 62 is positioned on the tool surface 22 of the tool 10. The preform 62 is positioned over the pluralities of grooves 42, 44, 46, 48, 52, 54, 56, 58 formed in the tool surface 22. In the example represented in FIG. 4, the preform 62 has a configuration that closely follows the configuration of the tool surface 22. However, the preform 62 could have other configurations different from the configuration of the tool surface 22.

A fluid impervious sheet 64, or second tool or vacuum bag 64 is then positioned on the tool surface 22. The vacuum bag 64 covers over the preform 62. The perimeter of the vacuum bag 64 is sealed to the tool surface 22 over the preform 62 and around the preform. This forms a sealed volume 66 between the vacuum bag 64 and the tool surface 22 that is occupied only by the preform 62. If resin distribution media is used elsewhere in the sealed volume 66, it is not present on the grooves 42, 44, 46, 48, 52, 54, 56, 58 or between the grooves and the preform 62. The grooves 42, 44, 46, 48, 52, 54, 56, 58 enable the use of resin distribution media to be significantly reduced. This is represented in FIG. 3.

A pressure differential 68 is applied to the sealed volume 66. The pressure differential 68 is represented schematically in FIG. 4. The pressure differential 68 can be introduced to the tool surface 22 and applied into the sealed volume 66 in any conventional manner. The pressure differential 68 applied to the sealed volume 66 between the vacuum bag 64 and the tool surface 22 draws the vacuum bag 64 down onto the preform 62 and infuses liquid resin into the preform 62.

A flow of liquid resin 70 is then supplied to the tool surface 22 and into the sealed volume 66. The flow of liquid resin 70 is represented schematically in FIG. 4. The flow of liquid resin 70 can be supplied to the tool surface 22 in any conventional manner. Although the flow of liquid resin 70 is represented as being supplied to the first edge 12 of the tool surface 22, toward the center of the first edge 12, the flow of liquid resin 70 could be supplied to the tool surface 22 at some other location around the tool surface. For example, the flow of liquid resin 70 could be introduced at one or more edges of the tool surface 22, or at discrete locations between the tool surface 22 and the preform 62.

Figure 5:
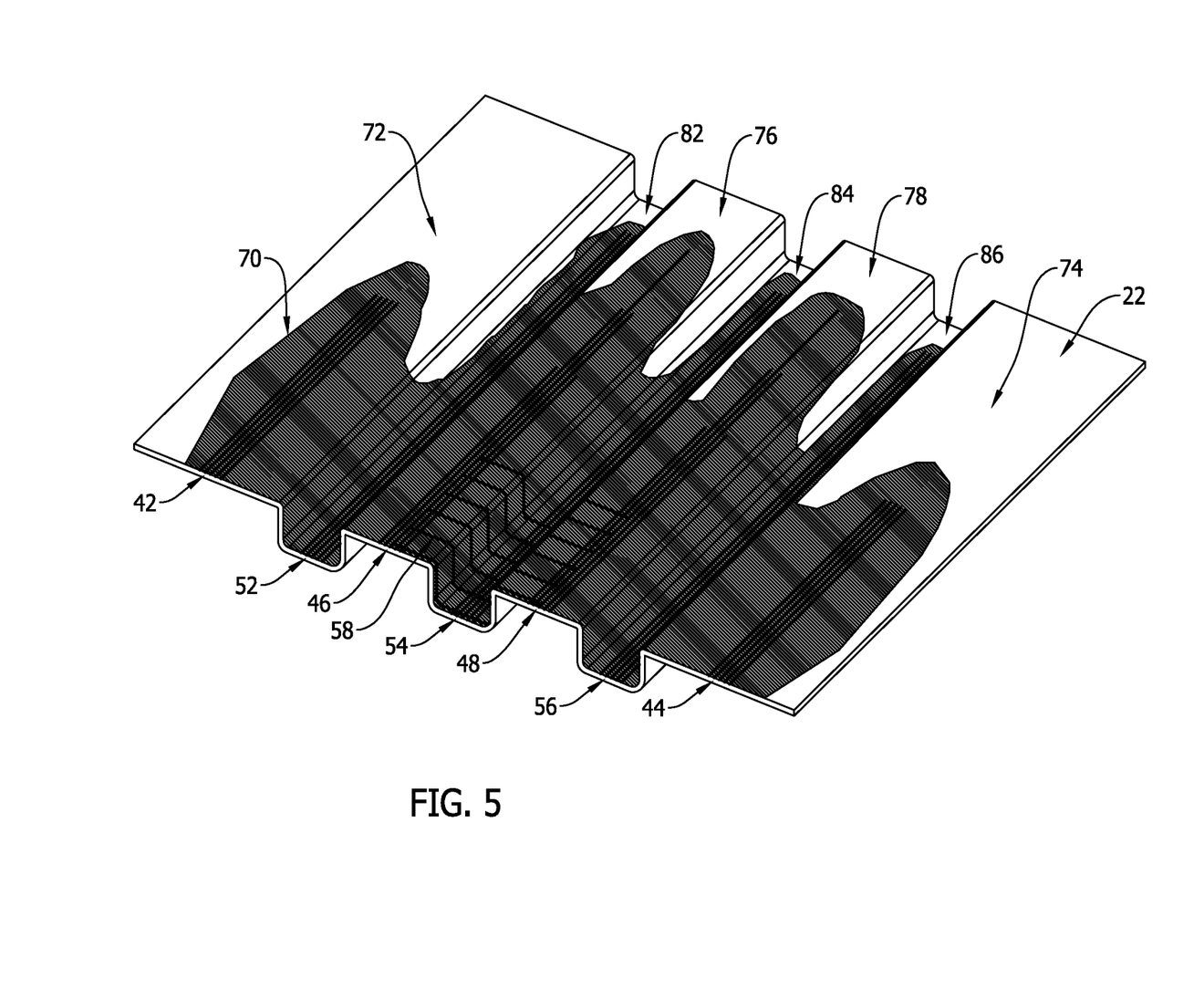
FIG. 5 is a representation of an isometric view of liquid resin being drawn across the tool surface of the tool of FIG. 1 using the pressure differential.

FIG. 5 is a representation of how the flow of liquid resin 70 supplied into the sealed volume 66 is directed across the tool surface 22 and through the perform 62 by the vacuum pressure pulling the flow of liquid resin through the grooves 42, 44, 46, 48, 52, 54, 56, 58 in the tool surface 22. The grooves 42, 44, 46, 48, 52, 54, 56 direct the flow of liquid resin 70 to targeted areas or discrete areas 72, 74, 76, 78, 82, 84, 86, respectively, on the tool surface 22. A first portion of the flow of liquid resin 70 is directed to the first discrete area 72 on the tool surface 22 through the first group of grooves 42. A second portion of the flow of liquid resin 70 is directed to the second discrete area 74 on the tool surface 22 through the second group of grooves 44. A third portion of the flow of liquid resin 70 is directed to the third discrete area 76 on the tool surface 22 through the third group of grooves 46. A fourth portion of the flow of liquid resin 70 is directed to the fourth discrete area 78 on the tool surface 22 through the fourth group of grooves 48. A fifth portion of the flow of liquid resin 70 is directed to a fifth discrete area 82 on the tool surface 22 through the fifth group of grooves 52. A sixth portion of the flow of liquid resin 70 is directed to the sixth discrete area 84 on the tool surface 22 through the sixth group of grooves 54. A seventh portion of the flow of liquid resin 70 is directed to the seventh discrete area 86 on the tool surface 22 through the seventh group of grooves 56. In this manner, the grooves 42, 44, 46, 48, 52, 54, 56 assist in the distribution of the liquid resin 70 throughout the preform 62.

Different volumes of the flow of liquid resin 70 can be supplied to the discrete areas 72, 74, 76, 78, 82, 84, 86 through grooves having different cross-section dimensions, different length dimensions and different configurations or patterns.

The liquid resin is then cured in the preform, forming the fiber reinforced composite part.

The composite part is then removed from the tool surface 22. Any cured resin remaining in the grooves 42, 44, 46, 48, 52, 54, 56, 58 in the tool surface 22 can then be removed from the grooves.

The patterns or configurations of the plurality of grooves 42, 44, 46, 48, 52, 54, 56, 58 represented in FIGS. 1-5 are not the only patterns or configurations of grooves that could be used in practicing the method of delivering and distributing liquid resin supplied to a tool surface throughout a dry fiber composite layup positioned on the tool surface in resin infusion and resin transfer molding. FIGS. 6-9 represent another example of liquid resin distribution grooves formed in a tool surface of a tool. The grooves of FIGS. 6-9 are formed in the same manner as those of FIGS. 1-3. The tool 90 of FIGS. 6-9 also has a general rectangular configuration similar to the tool 10 of FIGS. 1-5. However, the tool 90 could have other configurations. The tool 90 has a tool surface 92 with four planar sections 94, 96, 98, 102 and three trough sections 104, 106, 108. However, the tool surface 92 could have other configurations depending on the fiber reinforced composite part to be produced by the tool. The plurality of grooves formed in the tool surface 92 of FIGS. 6-9 include grooves 112, 114 formed in the respective outer planar sections 94, 96 of the tool surface 92. These grooves 112, 114 have substantially the same configurations or patterns with the grooves extending parallel and straight across the tool surface 92, but not completely across the tool surface.

The pluralities of grooves also include pluralities of grooves 116, 118, 122 that extend across the respective trough sections 104, 106, 108 of the tool surface 92. These pluralities of grooves 116, 118, 122 also have the same configurations or patterns, with the grooves being parallel and straight and extending across almost the entire lengths of the trough sections 104, 106, 108.

A further plurality of grooves 124 extend perpendicular to the other pluralities of grooves 112, 114, 116, 118, 122 and intersect with and communicate with grooves of the three pluralities of grooves 116, 118, 122 in the trough sections 104, 106, 108.

Figure 6:
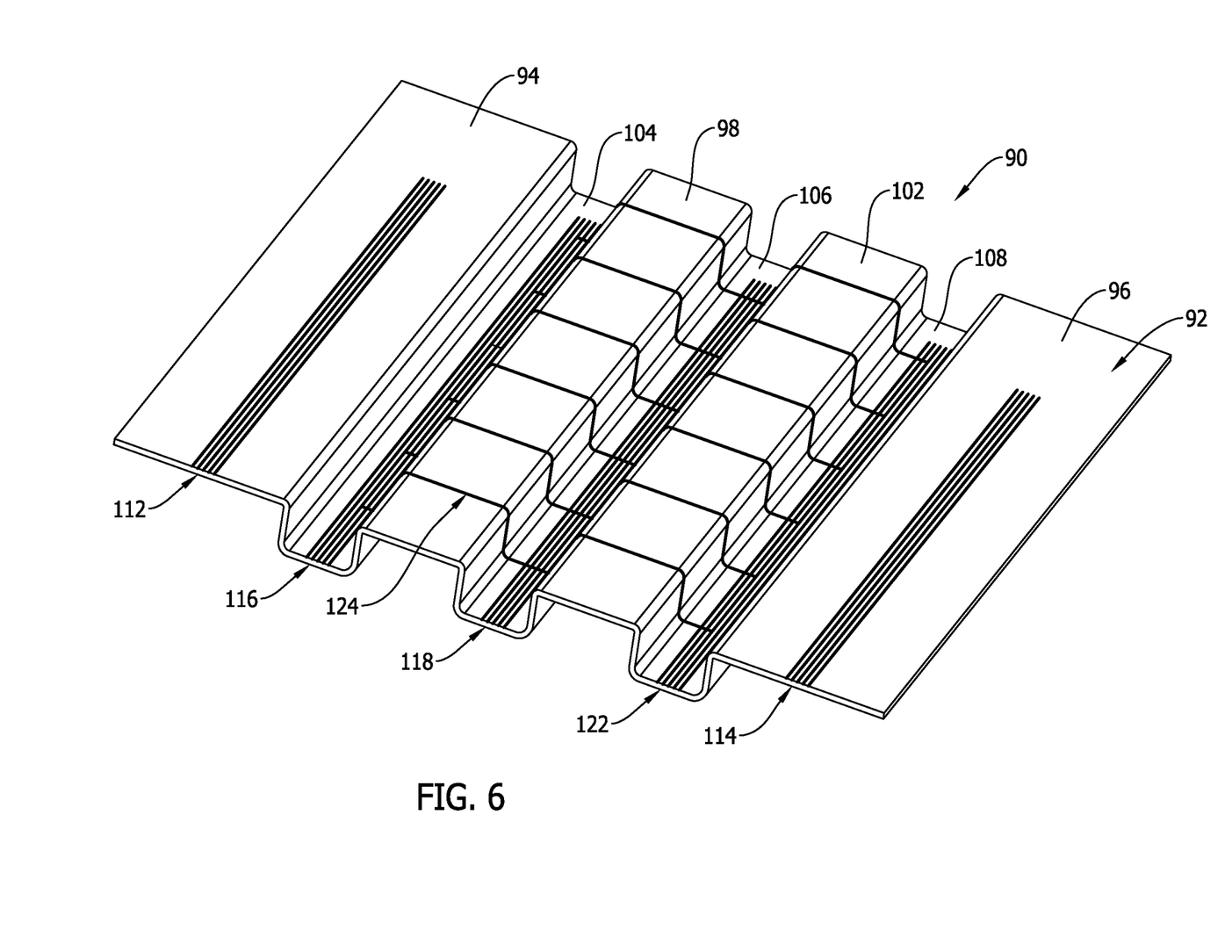
FIG. 6 is a representation of an isometric view of a second example of the tool of this disclosure.
Figure 7:
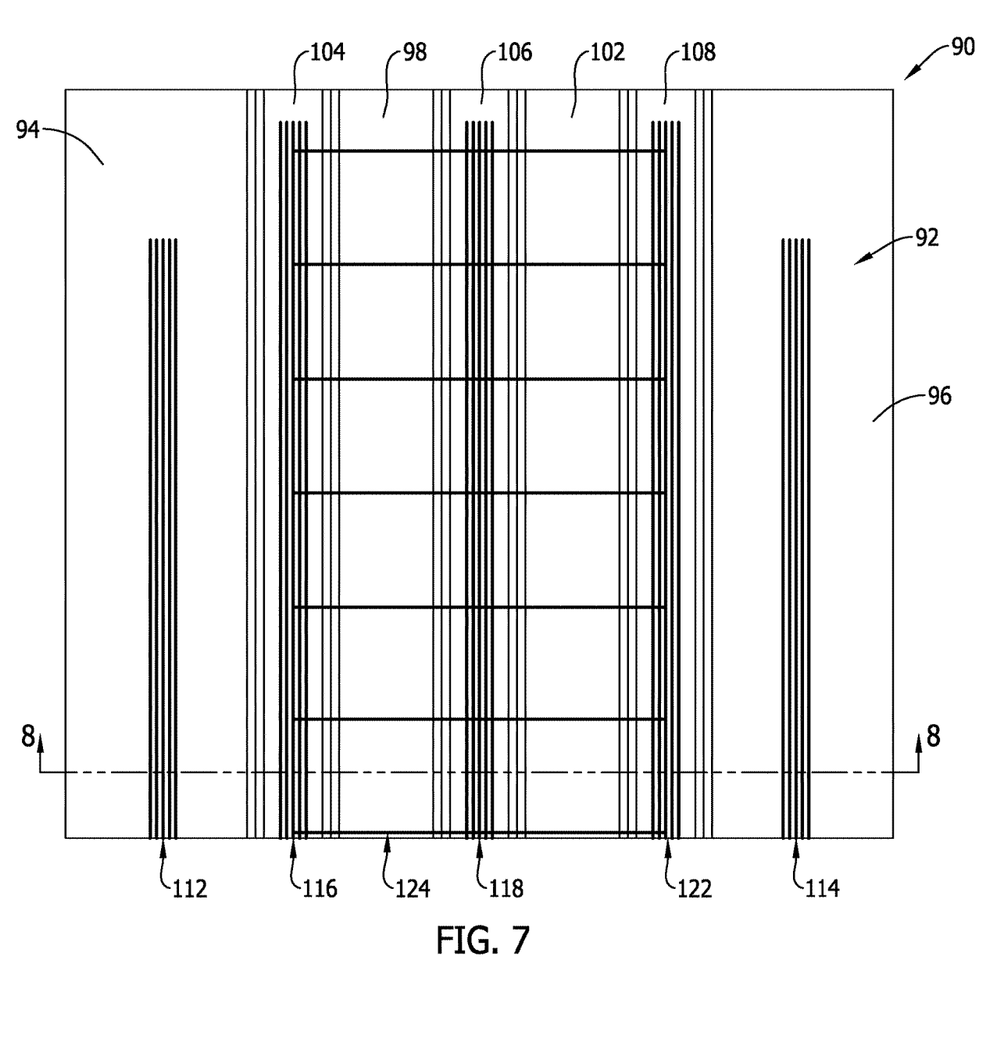
FIG. 7 is a representation of a plan view of the tool of FIG. 6.
Figure 8:
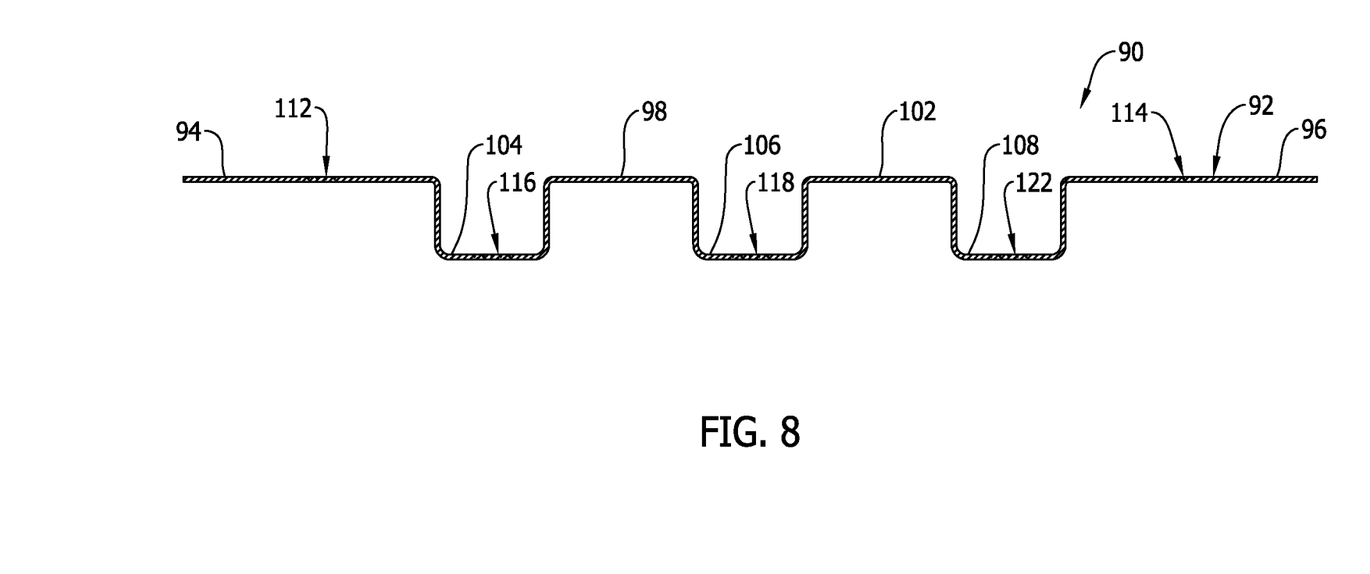
FIG. 8 is a representation of a cross-section view of the tool along the line 8-8 of FIG. 7.
Figure 9:
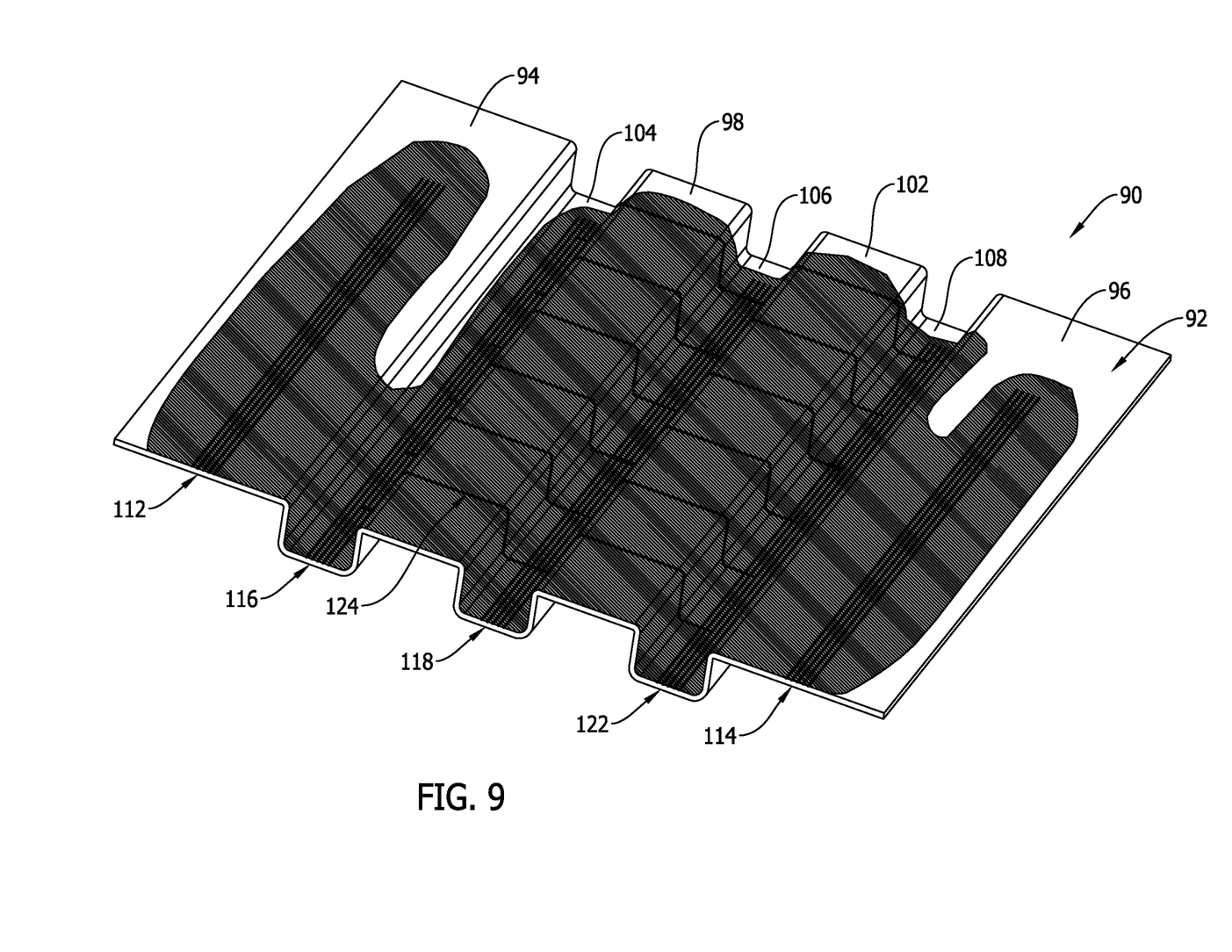
FIG. 9 is a representation of liquid resin being drawn across the tool surface of the tool of FIG. 6 using the pressure differential.

The representations of the grooves in FIGS. 6-8 show that the grooves in the tool surface can have various different configurations that best suit the grooves for directing and delivering liquid resin across the tool surface to discrete areas on the tool surface in basically the same manner as described earlier with reference to FIGS. 1-5. The pattern of the grooves eliminates the need for resin distribution media on the tool surface.

FIGS. 10-13 represent other possible configurations or patterns of grooves formed into a tool surface of a tool to assist in the distribution and delivery of liquid resin across the tool surface and into a preform on the tool surface without the need for resin distribution media.

Figure 10:
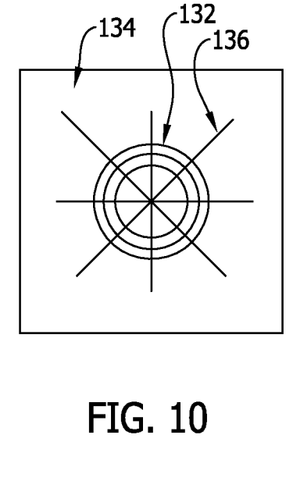
FIGS. 10-13 are representations of plan views of tools having different patterns or configurations of grooves formed in their tool surfaces.

FIG. 10 represents a first pattern of grooves 132 in the tool surface 134 and a second pattern of grooves 136 in the tool surface. As represented in FIG. 10, the first configuration or pattern of grooves 132 is comprised of circular, concentric grooves and the second configuration or pattern of grooves 136 is comprised of straight grooves that radiate outwardly from a center of the tool surface 134.

Figure 11:
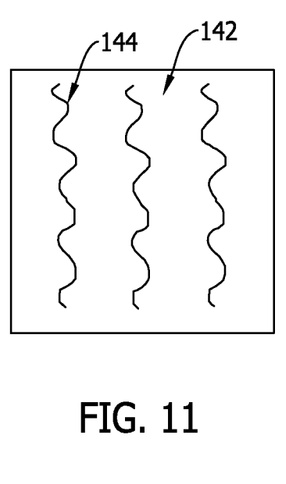

FIG. 11 represents a tool surface 142 having pluralities of grooves 144 formed in the tool surface. The pattern or configuration of the plurality of grooves 144 represented in FIG. 11 includes grooves that extend across the tool surface 142 with there being multiple tight bends or curves in the grooves 144.

Figure 12:
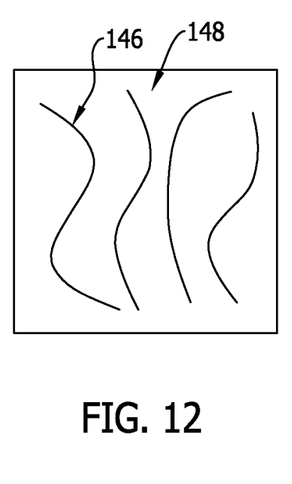

The plurality of grooves 146 in the tool surface 148 of the tool represented in FIG. 12 includes a plurality of grooves with large bends or curves that extend across the tool surface.

Figure 13:
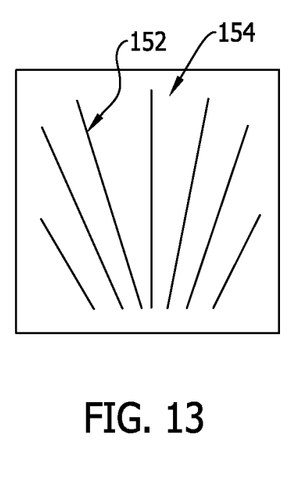
Figure 14:
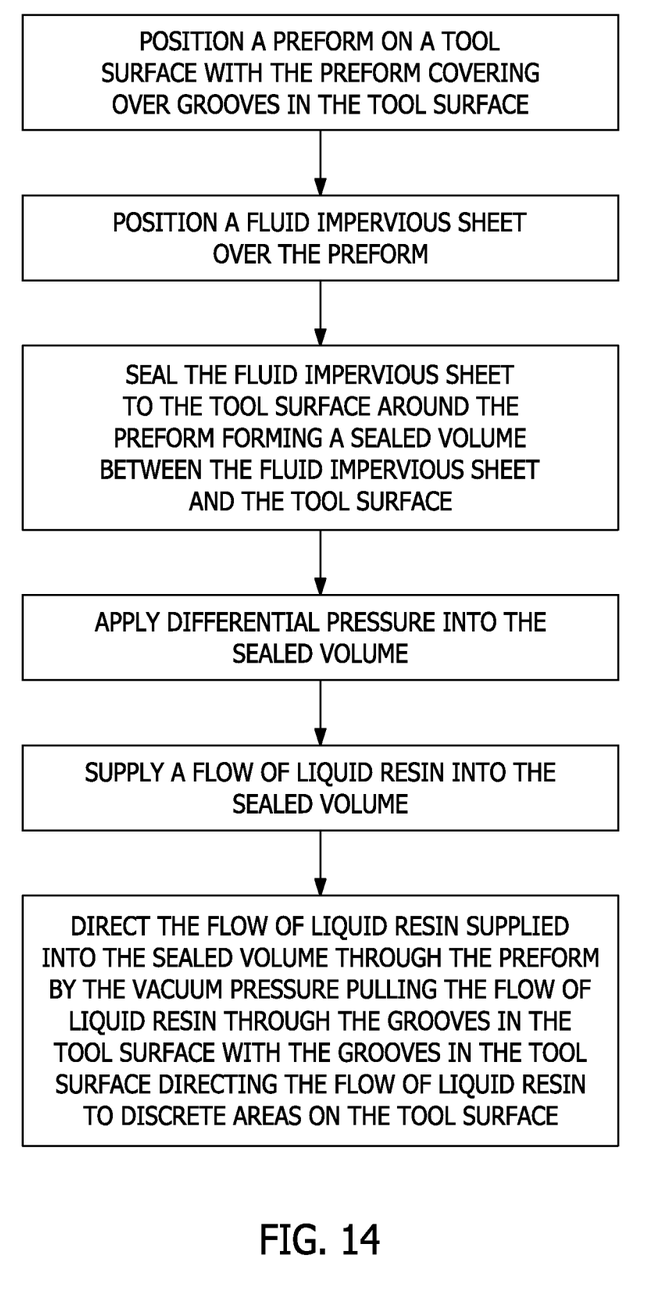
FIG. 14 is a flow chart of a method of this disclosure.

The plurality of grooves 152 in the tool surface 154 of the tool of FIG. 13 includes grooves 152 that extend straight across the tool surface 154 and spread across the tool surface as they extend across the tool surface.

Thus, as represented in the drawing figures, the pluralities of grooves formed in the tool surface can have a variety of different configurations or patterns, different lengths and different dimensions that best suit the grooves for delivering and distributing liquid resin across the tool surface and into a preform positioned on the tool surface without the need for resin distribution media.

As various modifications could be made in the constructions of the tools and their methods of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A method of infusing liquid resin into a preform, the method comprising:
   positioning a preform on a tool surface with the preform covering over a discrete network of grooves formed in the tool surface extending from a resin source, the grooves having different lengths that extend across the tool surface from a first edge of the tool surface toward an opposite second edge of the tool surface, but end short of the second edge at targeted, discrete areas on the tool surface with all of the grooves not extending completely across the tool surface;
   positioning at least one of a fluid impervious sheet, a second tool, and a vacuum bag on the tool surface over the preform;
   sealing at least one of the fluid impervious sheet, the second tool and the vacuum bag on the tool surface over the preform forming a sealed volume between the at least one of the fluid impervious sheet, the second tool, the vacuum bag, and the tool surface;
   supplying a pressure differential into the sealed volume;
   supplying a flow of liquid resin into the sealed volume; and,
   directing the flow of liquid resin supplied into the sealed volume to the targeted, discrete areas on the tool surface and through the preform by the pressure differential pulling the flow of liquid resin through the grooves in the tool surface with the grooves in the tool surface directing the flow of liquid resin into the targeted, discrete areas on the tool surface.

2. The method of claim 1, further comprising:
   directing different volumes of the flow of liquid resin supplied into the sealed volume to the discrete areas on the tool surface through grooves in the tool surface having different cross-section dimensions.

3. The method of claim 1, further comprising:
   directing different volumes of the flow of liquid resin supplied into the sealed volume to the discrete areas on the tool surface through grooves in the tool surface having different length dimensions.

4. The method of claim 1, further comprising:
   directing different volumes of the flow of liquid resin supplied into the sealed volume to the discrete areas on the tool surface through grooves in the tool surface having different configurations.

5. The method of claim 1, further comprising:
   directing a first portion of the flow of liquid resin supplied into the sealed volume to a first area on the tool surface through a first group of grooves in the tool surface; and,
   directing a second portion of the flow of liquid resin supplied into the sealed volume to a second area on the tool surface that is separate and discrete from the first area on the tool surface through a second group of grooves in the tool surface, the second group of grooves being separate from the first group of grooves.

6. The method of claim 5, further comprising:
   directing a third portion of the flow of liquid resin supplied into the sealed volume to a third area on the tool surface that is separate and discrete from the first area on the tool surface and is separate and discrete from the second area on the tool surface through a third group of grooves in the tool surface, the third group of grooves being separate from the first group of grooves and the second group of grooves.

7. The method of claim 1, further comprising:
   directing a first portion of the flow of liquid resin supplied into the sealed volume to a first area on the tool surface through a first pattern of grooves in the tool surface; and,
   directing a second portion of the flow of liquid resin supplied into the sealed volume to a second area on the tool surface that is separate and discrete from the first area on the tool surface through a second pattern of grooves in the tool surface, the second pattern of grooves being different from the first pattern of grooves.

8. The method of claim 1, further comprising:
   curing the liquid resin in the preform and thereby forming a composite part; and,
   removing the composite part from the tool surface.

9. The method of claim 8, further comprising:
   removing any cured resin from the grooves in the tool surface.

10. The method of claim 1, further comprising:
    a first portion of the flow of liquid resin is directed to a first discrete area on the tool surface through a first group of grooves;
    a second portion of the flow of liquid resin is directed to a second discrete area on the tool surface through a second group of grooves; and,
    a third portion of the flow of liquid resin is directed to a third discrete area on the tool surface through a third group of grooves.

11. A method of infusing liquid resin into a preform, the method comprising:
    using a tool having a tool surface with a discrete network of grooves formed in the tool surface extending from a resin source, the grooves having different lengths that extend across the tool surface from a first edge of the tool surface toward an opposite second edge of the tool surface; but end short of the second edge at targeted, discrete areas on the tool surface with all of the grooves not extending completely across the tool surface;
    positioning a preform on the tool surface over the grooves;
    securing at least one of a fluid impervious sheet, a second tool, and a vacuum bag on the tool surface over the preform forming a sealed volume between the at least one of the fluid impervious sheet, the second tool and the vacuum bag and the tool surface;

supplying a pressure differential to the tool surface;

supplying a flow of liquid resin onto the tool surface; and, infusing the flow of liquid resin supplied onto the tool surface into the preform by the pressure differential drawing the flow of the liquid resin across the tool surface and through the grooves in the tool surface with the grooves in the tool surface directing the flow of liquid resin to the targeted, discrete areas on the tool surface and infusing the flow of liquid resin into the preform on the tool surface at the targeted, discrete areas of the tool surface.

12. The method of claim 11, further comprising:

directing different volumes of the flow of liquid resin supplied onto the tool surface across the tool surface to the discrete areas on the tool surface through grooves in the tool surface that extend to the discrete areas and have different cross-section dimensions.

13. The method of claim 11, further comprising:

directing different volumes of the flow of liquid resin supplied onto the tool surface across the tool surface to the discrete areas on the tool surface through grooves in the tool surface that extend to the discrete areas and have different length dimensions.

14. The method of claim 11, further comprising:

directing different volumes of the flow of liquid resin supplied onto the tool surface across the tool surface to discrete areas on the tool surface through grooves in the tool surface that extend to the discrete areas and have different configurations.

15. The method claim 11, further comprising:

directing a first portion of the flow of liquid resin supplied onto the tool surface across the tool surface to a first area on the tool surface through a first group of grooves in the tool surface that extend to the first area; and, directing a second portion of the flow of liquid resin supplied onto the tool surface across the tool surface to a second area on the tool surface that is separate and discrete from the first area on the tool surface through a second group of grooves in the tool surface that extend to the second area, the second group of grooves being separate from the first group of grooves.

16. The method of claim 11, further comprising:

directing a first portion of the flow of liquid resin supplied onto the tool surface across the tool surface to a first area on the tool surface through a first pattern of grooves in the tool surface that extend across the tool surface to the first area on the tool surface; and, directing a second portion of the flow of liquid resin supplied onto the tool surface across the tool surface to a second area on the tool surface that is separate and discrete from the first area on the tool surface through a second pattern of grooves in the tool surface that extend across the tool surface to the second area on the tool surface.

17. The method of claim 16, further comprising:

the first pattern of grooves in the tool surface being different from the second pattern of grooves in the tool surface.

18. The method of claim 16, further comprising:

directing a third portion of the flow of liquid resin supplied onto the tool surface across the tool surface to a third area on the tool surface that is separate and discrete from the first area on the tool surface and separate and discrete from the second area on the tool surface through a third group of grooves in the tool surface that extend across the tool surface to the third area on the tool surface.

19. The method of claim 11, further comprising:

the plurality of grooves in the tool surface eliminating a need for a resin distribution media on the tool surface.

20. The method of claim 11, further comprising:

a first portion of the flow of liquid resin is directed to a first discrete area on the tool surface through a first group of grooves;

a second portion of the flow of liquid resin is directed to a second discrete area on the tool surface through a second group of grooves; and, a third portion of the flow of liquid resin is directed to a third discrete area on the tool surface through a third group of grooves.

* * * * *